(12) United States Patent
Rasmussen (10) Patent No.: US 8,418,402 B2
(45) Date of Patent: Apr. 16, 2013

(54) CROP COVER

(75) Inventor: Dorthe Rasmussen, Holbæk (DK)

(73) Assignee: Growcamp A/S, Holbaek (DK)

( * ) Notice: Subject to any disclaimer, the term of this patent is extended or adjusted under 35 U.S.C. 154(b) by 365 days.

(21) Appl. No.: 12/995,722

(22) PCT Filed: Jun. 2, 2009

(86) PCT No.: PCT/DK2009/000125
§ 371 (c)(1),
(2), (4) Date: Dec. 2, 2010

(87) PCT Pub. No.: WO2009/146701
PCT Pub. Date: Dec. 10, 2009

(65) Prior Publication Data
US 2011/0078950 A1   Apr. 7, 2011

(30) Foreign Application Priority Data

Jun. 2, 2008 (DK) ............................. 2008 00107 U
Jun. 2, 2008 (DK) ................................ 2008 00758

(51) Int. Cl.
*A01G 13/02* (2006.01)
(52) U.S. Cl.
USPC ......................................................... 47/20.1
(58) Field of Classification Search ........... 47/17
See application file for complete search history.

(56) References Cited

U.S. PATENT DOCUMENTS

| 2,986,150 | A |   | 5/1961 | Torian |
|---|---|---|---|---|
| 4,614,838 | A | * | 9/1986 | Sandstrom .................. 174/70 C |
| 4,961,297 | A | * | 10/1990 | Bernard ......................... 52/93.1 |
| 5,606,986 | A |   | 3/1997 | Muise |
| 5,784,842 | A | * | 7/1998 | Wackerbauer .................. 52/222 |
| 6,338,226 | B1 | * | 1/2002 | Gauthier et al. .................. 52/63 |
| 2009/0230257 | A1 | * | 9/2009 | Reyen et al. ................. 248/74.2 |
| 2011/0078950 | A1 | * | 4/2011 | Rasmussen .................... 47/20.1 |

FOREIGN PATENT DOCUMENTS

| EP | 0012834 |   | 1/1981 |
|---|---|---|---|
| EP | 0021834 |   | 1/1981 |
| EP | 0063015 |   | 10/1982 |
| EP | 0306717 |   | 3/1989 |
| FR | 2679734 |   | 2/1993 |
| GB | 2172040 |   | 9/1986 |
| GB | 2172040 | A * | 9/1986 |
| GB | 2335130 |   | 9/1999 |
| WO | 01/04431 |   | 1/2001 |
| WO | WO 0104431 | A1 * | 1/2001 |

* cited by examiner

*Primary Examiner* — Frank T Palo
(74) *Attorney, Agent, or Firm* — James Creighton Wray (57) ABSTRACT

A cover for a crop, wherein the cover includes a framework and a flexible cover supported by the framework. The framework includes side members provided with a first part of a Velcro fastening, and the flexible cover is divided into sections with edge areas that follow the first part of the Velcro fastening and are provided with an interacting second part of a Velcro fastening for attaching the edge area of the section on the side member.

16 Claims, 13 Drawing Sheets

CROP COVER

This application claims the benefit of Danish Application No. PA 2008 00758 filed Jun. 2, 2008, Danish Application No. BA 2008 00107 filed Jun. 2, 2008 and PCT/DK2009/000125 filed Jun. 2, 2009, and the amended sheets from the IPER, which are hereby incorporated by reference in their entirety as if fully set forth herein.

FIELD OF THE INVENTION

The present invention concerns a cover for a crop, wherein the cover includes a framework and a flexible cover supported by the framework and flexible cover supported by the framework, wherein the flexible cover is divided into sections with edge areas that may be released from the framework independently of each other in order thereby to give access to the crop, wherein the flexible cover constitutes an insect barrier between the volume under the framework and the surroundings outside the cover, wherein the framework includes side members provided with a first part of a Velcro fastening, and that the edge areas follow the first part of the Velcro fastening and are provided with an interacting second part of a Velcro fastening for attaching the edge area of the section on the side member.

BACKGROUND OF THE INVENTION

Covers for crops, primarily horticultural crops, are known, where the cover includes a framework of piping that carries a net for protecting the crops against insects and birds. Such covers are used in connection with high beds in gardens and their design is inspired by covers for greenhouses, where a framework of larger dimensions carries nets, glass panes or transparent plastic films.

The covers of high beds may typically be opened by loosening the net from the framework and lifting the net aside. However, exposing the entire high bed is often not expedient, particularly in case of large high beds, as exposing the whole high bed provides increased access for insects in the period of time where the cover is removed. It would be advantageous to suffice with lifting just a part of the net aside in order to provide access to a part of the bed.

Large greenhouses are also known with a cover of double plastic film. For example, in EP application 21 8 34 is disclosed a greenhouse where double-walled plastic films extend from the roof ridge and to the sides, and other plastic films extend down along the sides. The plastic films are fastened around poles placed in countersunk grooves, where the rail on the roof ridge is permanently fastened, while the rail at the sides is fastened by hook-like engagement with a bent rail. The principle is not intended for smaller units for horticultural use, and an entrance will traditionally be at the end of the greenhouse. A possible exposing of the sides may only take place by opening a whole side at a time, which is inexpedient. In addition, an unsuitable amount of force has to be used for releasing the flexible cover from the hook-like engagement.

Another type of greenhouse is described in EP 306 717. On a rod framework is provided inflatable double flexible covers which along their edges are fastened around rods provided in countersunk grooves in the framework. These double flexible covers are not intended to be loosened from the rods in order to access the crops. Different types of greenhouses are disclosed in WO01/04431, FR2679734, U.S. Pat. No. 2,986,150. None of these greenhouses comprise the possibility for using flexible covers having equal length without difficulties.

By greenhouses of glass, like in GB 2 172 040, it is known to provide the bottom side of the glass with canvases for screening against light. Access to the greenhouse traditionally occurs through a door. The system is an expensive traditional system and not suited for customers wanting a light and flexible system at a low cost.

OBJECT OF THE INVENTION

It is the object of the invention to provide a light and flexible cover for crops where only small areas of the cover can be opened for access to a part of the bed and where flexible covers having equal lengths may be used without difficulties.

DESCRIPTION OF THE INVENTION

This object is achieved by a cover for a crop, wherein the cover includes a first profile extending across the crops, where the profile has a first concave groove at the side of the profile, and where the flexible cover is provided with a rim bead inserted in the first groove for retaining the flexible cover in the first profile, wherein the first profile has a lower groove and an upper groove, being said first groove, at one side of the profile for inserting two rim beads at different levels for two different flexible covers, wherein the lower groove of the profile is provided closer to a vertical longitudinal section of the profile than the upper groove.

By dividing the cover into sections, it is possible for the user to get access to the crop by only opening or removing a single section instead of removing the entire flexible cover. The framework and the flexible cover can be designed in light materials with high flexibility with regard to use. For example, the cover may easily be moved due to light weight in contrast to a greenhouse of glass.

The framework includes side members provided with a first part of a Velcro fastening, and the flexible cover is divided into sections with edge areas that follow the first part of the Velcro fastening and are provided with an interacting second part of a Velcro fastening for attaching the edge area of the section on the side member.

By the term Velcro fastening is meant a "fabric hook and loop fastener", i.e. the fastening has a hook part with miniature hooks and a loop part with miniature loops. The term Velcro fastening is used irrespectively that this kind of fastening possibly is not made under the trademark Velcro.

In contrast to the above publication GB 2 172 040, the cover does not have any glass panes on which Velcro fastening can be attached. Thus it is the flexible cover and not glass panes that form an insect barrier between the volume under the framework and the surroundings around the cover.

On the flexible cover and the side members, such Velcro fastenings may be provided by bonding the Velcro material on the flexible cover and/or the side member. The Velcro material may alternatively be sewn on the flexible cover. As a further alternative, the side members can be provided with mechanical fastening means, such as press buttons or hooks.

The side members are provided with longitudinal grooves, e.g. with a T-profile. Into this groove are pushed rails having a corresponding bead, e.g. a T-shaped bead, along the profile. Such a bead may e.g. be provided along a centre line at one side of the profile. The Velcro material is fastened to these rails. The advantage is that these Velcro rails can be replaced when not closing properly any more, without having to replace the entire side member. Furthermore, this also provides greater freedom with regard to how the Velcro material is to be fastened. In some cases it has appeared that bonding is not always optimal since continuous action by weather counteracts the durability of the glue. This problem is e.g. prevalent in a system as described in GB 2 172 040 mentioned in the introduction where the glue is directly exposed to sunlight through the panes.

An alternative method has been found, providing the rails in a plastic material and then sewing the Velcro material on the rail by the thread through the plastic material. In order to sew through the plastic material, it has to be of such nature that the sewing needle can penetrate the material. On the other hand, a certain mechanical stability is also required of the material. These two factors draw in opposite directions, and they are therefore to be balanced in relation to each other. One of many possible solutions is found by providing a rail as an elongated flat profile having a number of webs along the flat profile, where the material along these webs is thinner than the rest of the flat profile. The sewing is performed along these webs in order to facilitate the needle's penetration of the material. On the other hand, the otherwise thicker material of the rest of the flat profile ensures the required mechanical stability.

In contrast to many other fastening options, the Velcro fastening has appeared to be reliable and durable in time. Such Velcro fastenings may even be cleaned by washing with e.g. a high-pressure cleaner. In contrast it is to be mentioned that joining the sections by zip fastener has appeared to be less advantageous as soil and dust and moisture impedes reliable function of the zip fastener, even after a short time.

Velcro fasteners are robust and durable even by frequent use. They are also easy to release and fasten and are tight even against small insects. Velcro fasteners also have the advantage that attaching the section to the side members can occur at various heights. The section may e.g. be fastened to the side members in a shape where it forms folds, which is an easy way of regulating the size of openings in the area of the sections.

Another way of keeping sections open is to roll the section together and then to hold this rolled-up section with cords or rubber bands, a principle which is known from camping tents.

The Velcro fasteners have a hook part with miniature hooks and a loop part with miniature loops. In the most preferred embodiment, the hook part is provided on the side members and the loop part is located at the edge areas of the flexible cover.

Such a cover may e.g. be provided with four sections, of which two form the ends/gables of the cover, and the other two form the sides. The four sections may then e.g. be fastened to side members in the form of corner posts or on side members adapted therefor in the corners. Another alternative is a cover comprising two end sections and several side sections at each side in continuation of each other. This is particularly advantageous when the sides are rather long, and it is desired at the same time that there is only access to a small part of the crops at a time. The Velcro fastening then provides that a single side section can be opened without loosening other side sections from the side members. This is a great advantage compared with a less advantageous solution where side sections are mutually joined by zip fastener such as known from awnings for camping caravans, as zip-joined sections cannot be individually loosened without also loosening the adjacent section.

If the cover has a pitched roof, the longitudinal direction of the cover is defined as the direction in parallel with the ridge of the pitched roof. In that case, by side sections is meant the sections following the longitudinal direction, while end sections are those situated transversely of the roof ridge.

Advantageously, the cover is provided by a number of uniform modules in continuation of each other in order thereby to form a larger modularly constructed cover. Each module then has two sides, and the modules provided at the ends of the assembled modular cover also have each their end face. The flexible cover assembled at one side across several modules is divided into sections, namely one section per module. Alternatively, each side of a single module may have several sections of the flexible cover, providing access to a smaller part of a module.

Without restricting the scope of the invention in general, it has, however, appeared advantageous with a length of the module between one and two meters, preferably between one and one and a half meter, e.g. around 1.2 m. Advantageous is also a width of a single module between one and two meters, preferably between one and one and a half meter, e.g. around 1.2 m. Furthermore, it is advantageous with a height between one and two meters, preferably between 1.2 m and 1.7 m, e.g. around 1.5 m.

The individual sections may e.g. have a lower horizontal edge area and two edge areas extending upwards therefrom. This means that all sections are interconnected along their upper part. A single section may then be released from its fastening and be rolled up along the side, analogous to a curtain which is rolled up. Since the edge areas are fastened to the side members, it is therefore preferred that the side members follow vertical cross-sections of the cover. For example, a side member may extend vertically upwards and/or in an angle from the side and inwards against a beam running along the framework.

Moreover, the sections of the flexible cover can be provided with a horizontal edge area which is also provided with one part of a Velcro fastening which interacts with a horizontal counterpart on the framework with a corresponding interacting Velcro fastening. This horizontal counterpart may alternatively also be provided on panels used for supporting the framework.

The horizontal counterpart on the framework may be a web of Velcro fastening directly attached to the framework, e.g. on side members and/or panels. The Velcro counterpart may alternatively be provided on profiles attached to side members and/or panels. Such a profile is e.g. a flat profile where the Velcro material is sewn on, where the flat profile is then attached to the panel. For example, the above described profiles with a bead may be used, e.g. a T-shaped bead which is inserted into a corresponding panel groove, e.g. T-shaped groove.

The above mentioned mutual connection between the sections is provided by means of a first section on which the individual sections are fastened. Such a first section extends a cross the crops along the cover as a centre beam between the ends of the framework. This first profile may also be used as a joining beam for the side members extending obliquely from the side and in towards this first section.

In particular, the first section has a first concave, countersunk groove at the side of the profile for receiving an edge bead with which the flexible cover—e.g. the sections—is provided. This principle is known from the fastening of awnings on camping caravans. If desired, the first profile is provided with such a groove at each side of the profile and along the profile.

Further, the profile is provided with a lower groove and an upper countersunk groove at one side of the profile or on both sides of the profile for inserting two edge beads from two different flexible covers at different heights, e.g. an edge bead for a net and an edge bead for a plastic film above the net. This may be significant when desired to vary the temperature under the cover. In that case, it may e.g. be decided to have a film cover, e.g. in the form of a thin tarpaulin or a plastic film, closed at night to keep the warmth, while being rolled up along the sides of the cover during the day in order to allow air circulation around the crops. In another example, a film membrane is used lowermost and insulating sheets or canvases are inserted in the upper groove. Such insulating sheets or films or canvases may e.g. be used at night in cold periods, but may be removed in the daytime. Other combinations of nets, plastic film and insulating layers of different nature may also find application in connection with the invention.

It is thus also an invention to provide a cover of the above mentioned nature where the cover has a double layer of flexible covers, where the lower flexible cover is a net and the upper flexible cover is a plastic film. Alternatively, it is a double layer wherein the lower flexible cover is a plastic film whereas the upper flexible cover is a flexible and insulating layer.

If both grooves are used where one flexible cover is disposed above a second flexible cover, there is the risk that the lower edge areas of flexible covers with the same length end up at different heights. In some cases, this is inexpedient. It is advantageous that the lower groove of the profile is provided closer to a vertical section of the end of the profile than the upper groove. If a groove is provided along both sides of the profile, this will mean that the lower grooves are closer together than the two upper grooves. In that way is compensated for the distance existing from the two different grooves and to the area where the edge areas of the sections are fastened. By a double-layered structure, the lower flexible cover will be provided with a first Velcro fastening for closing towards the framework or the panels, and with a second Velcro fastening at the opposite side of the material for interacting with the outermost flexible cover in such a way that the access of animals is closed to the intermediate space between the flexible covers.

The framework is advantageously an assembly kit of profiles with connecting pieces, e.g. at the corners. Furthermore, a lower part of the cover may include panels that are assembled as a support for the framework.

Analogously to the grooves in the first profile extending along the cover, there may be provided an end profile with grooves in which end sections are fastened by a corresponding bead.

Attacks on crops by snails or slugs are well-known, and with covers and greenhouses intrusion attempts by snails and slugs may imply the nuisance that the material is slimed over. In order to avoid snail attacks on the flexible cover, the cover, e.g. the side panels, may advantageously be provided with a slug/snail barrier. In a possible embodiment, the slug barrier extends along the cover or along the panels at an oblique angle downwards and outwards from the cover or panel. In that way is achieved a downwardly directed edge which is difficult to pass for the slug. In order to make it more difficult for the slug, this barrier can be provided with several such lower edges, e.g. in the form of fins at the underside of the barrier, where the fins also extend downwards, e.g. at a different angle than the oblique angle at which the snail barrier extends away from the cover or the panels.

As a further countermeasure, the slug barrier can be provided with surface areas with copper. Stripes of copper may e.g. extend along the slug barrier, making it impossible for the slug to overcome the barrier without getting in contact with the copper.

Preferred embodiments of the cover are provided a framework extending vertically and then sloping in towards an upper profile which runs centrally along the cover, forming a roof ridge. The shape of the cover thus represents the shape of a rectangular house with ridge roof. As described above, under the vertical part of the framework there may be provided panels as lateral delimitation. Such panels may be buried in the earth around the area of the crops in order thereby also to protect the crops against pests which tend to crawl in under covers.

The panels are advantageously extruded plastic panels with longitudinal channels, e.g. in a honeycomb structure. These channels may also be used for accommodating pipe sections from assembly profiles between the panels, e.g. assembly profiles in the form of corner posts.

DESCRIPTION OF THE DRAWING

The invention is elaborated in more detail in the following with reference to the drawing, wherein:

FIG. 1 shows a drawing of a cover in perspective view with a) a single module and b) two modules put together;

FIG. 2 shows a second drawing of a cover with a) a total view in perspective, b) a detail of a corner area, c) a detail of the central beam, d) a detail of the fastening of the lower edge of flexible cover, and d) a detail of the rolled-up flexible cover;

FIG. 3 shows a) a partially exploded perspective view of the cover, b) a detail of the view, c) a partially exploded view of the cover as seen from the end, d) an enlarged detail of the central beam;

FIG. 8 shows a system where one part of the Velcro fastening is provided flat profiles which are slid into a) the sloping side members, b) the vertical side members, and c) a detailed drawing of an embodiment on a vertical side member;

FIG. 10 shows a) the assembled panel with flat rail and b) the procedure of sliding the flat profile into the panel.

DETAILED DESCRIPTION OF THE INVENTION

Figure 1A:
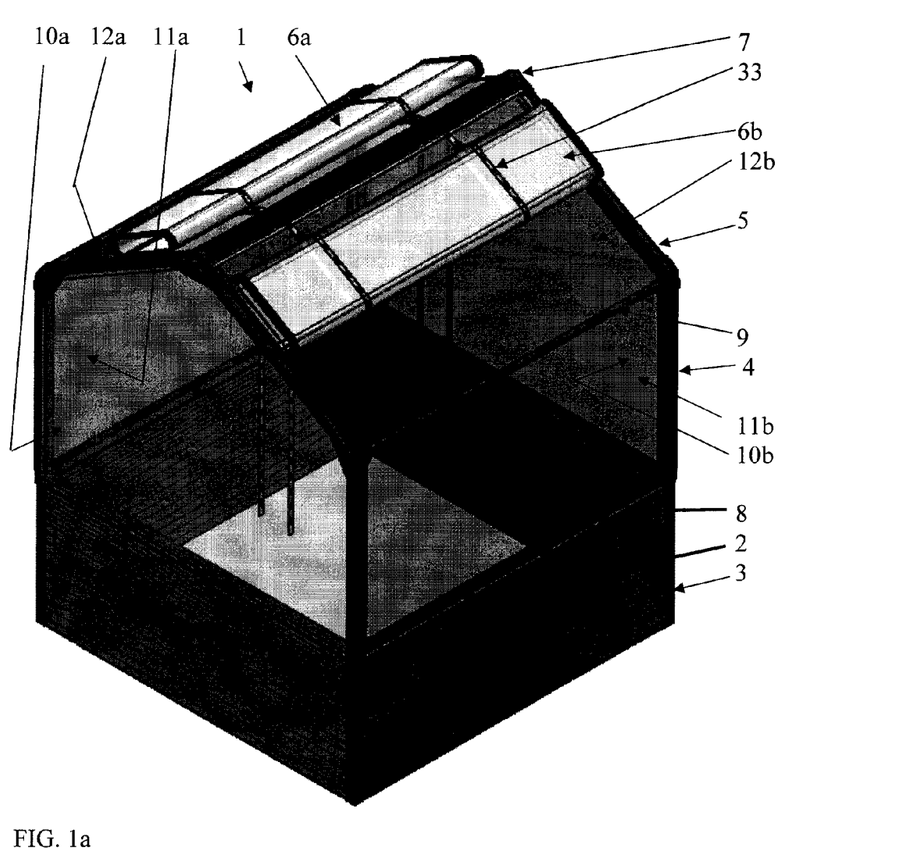

FIG. 1a is a drawing of a cover in perspective view. The cover 1 includes four lower side panels 2 that are held together by corner posts 3. Above the side panels 2, vertical side members 4 extend as part of the corner posts 3 vertically up to a level where they support sloping side members 5 that form a roof together with part of two outer flexible covers 6a, 6b. On the drawing, the two outer flexible covers 6a, 6b are partly rolled up and retained by a band 33. The vertical side members 4, the sloping side members 5, a central beam 7 and further horizontal side members 8 or rods 9 form a framework for supporting the two upper flexible covers 6a, 6b.

Not so clearly visible, the end faces and the side faces and the roof faces of the cover 1 are covered by sections 10a, 10b, 11a, 11b, 12a, 12b of net. It is thus about a double flexible cover with net sections 10a, 10b, 11a, 11b, 12a, 12b as inner flexible cover and film or tarpaulin as outer flexible cover 6a, 6b.

Figure 1B:
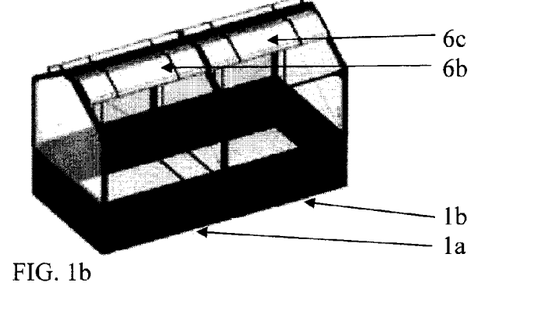

FIG. 1b shows a drawing of two modular covers 1a and 1b in continuation of each other in their longitudinal direction. The longitudinal direction is here defined as the direction along the ridge of the pitched roof. It is clearly seen that the cover of the two modules 1a, 1b are divided into sections 6b, 6c in longitudinal direction of the cover. The flexible cover can therefore not only be opened at each side of a single module 1*a*, 1*b*, but also for each of the modules 1*a*, 1*b* in longitudinal direction. The sectional construction of the flexible cover thus allows easy access to a smaller part of the total area covered by the cover—which in the present case is constituted by two modules but which also may involve more modules. The drawing shows a single flexible cover on each of the two pent roofs of the module, but the pent roof of each module may also be covered by several smaller sections of flexible cover, e.g. two or three sections.

If several covers 1 are arranged in continuation of each other, typically only the two end faces of the total cover are covered by net sections 11*a* and 11*b*. The advantage of such a cover is a structure of uniform modules in continuation of each other. The cover according to the invention is thereby provided a universal property with great flexibility. Depending on the desired size, more or less modules can be joined in continuation of each other into a unit where each side of a module can be opened separately, without having to open other modules.

Figure 3A:
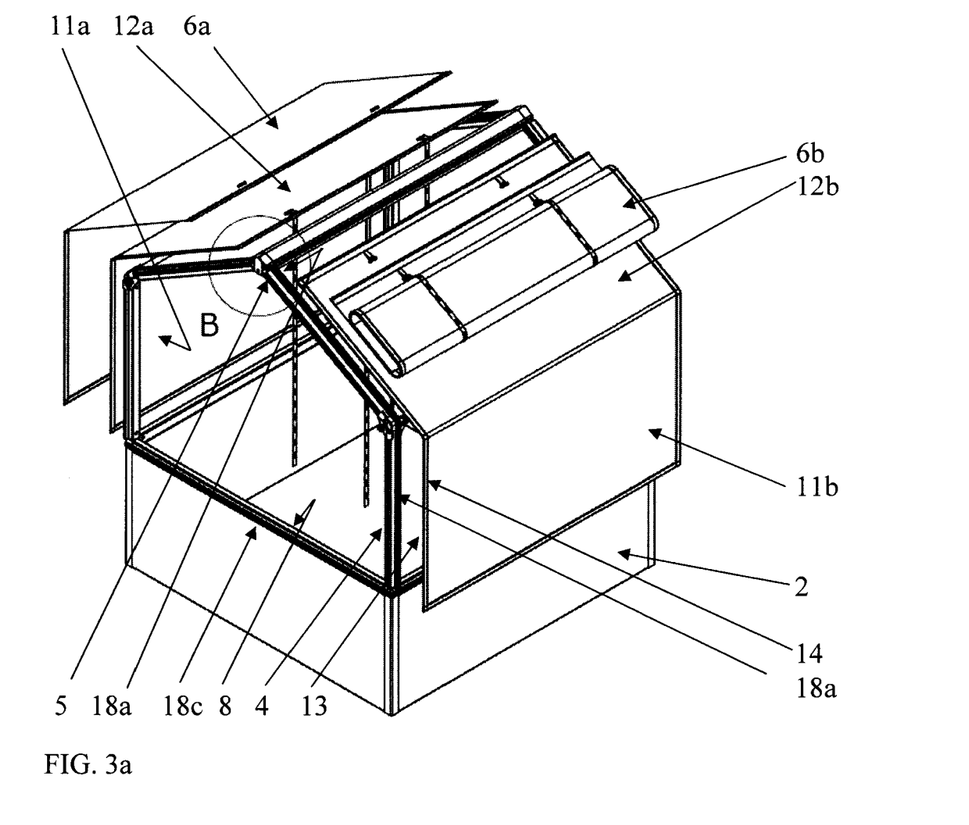

FIG. 3*a* shows a partially exploded drawing where the net sections 11*a*, 11*b*, 12*a*, 12*b* are only shown on the roof and the sides since it concerns a module which is to be brought together with corresponding modules in continuation of each other. One section of the outer flexible cover 6*a* is rolled out over on roof half part and one side. The other section 6*b* of the outer flexible cover is rolled up along the other roof half part.

Figure 3B:
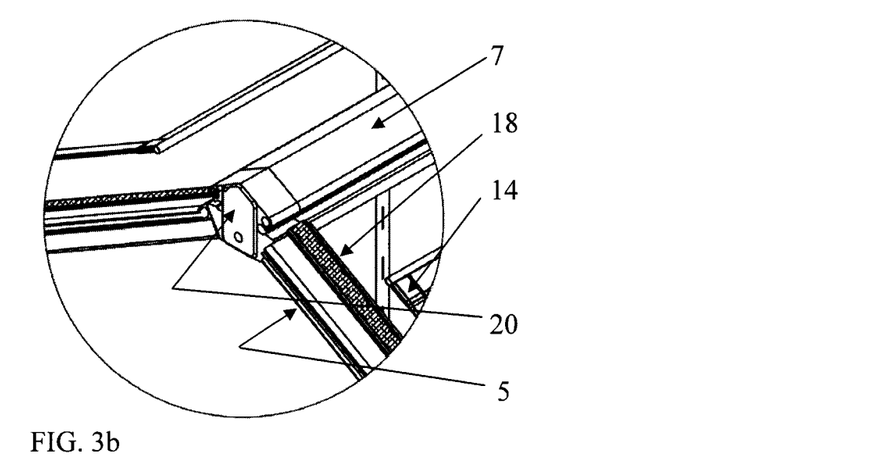
Figure 3C:
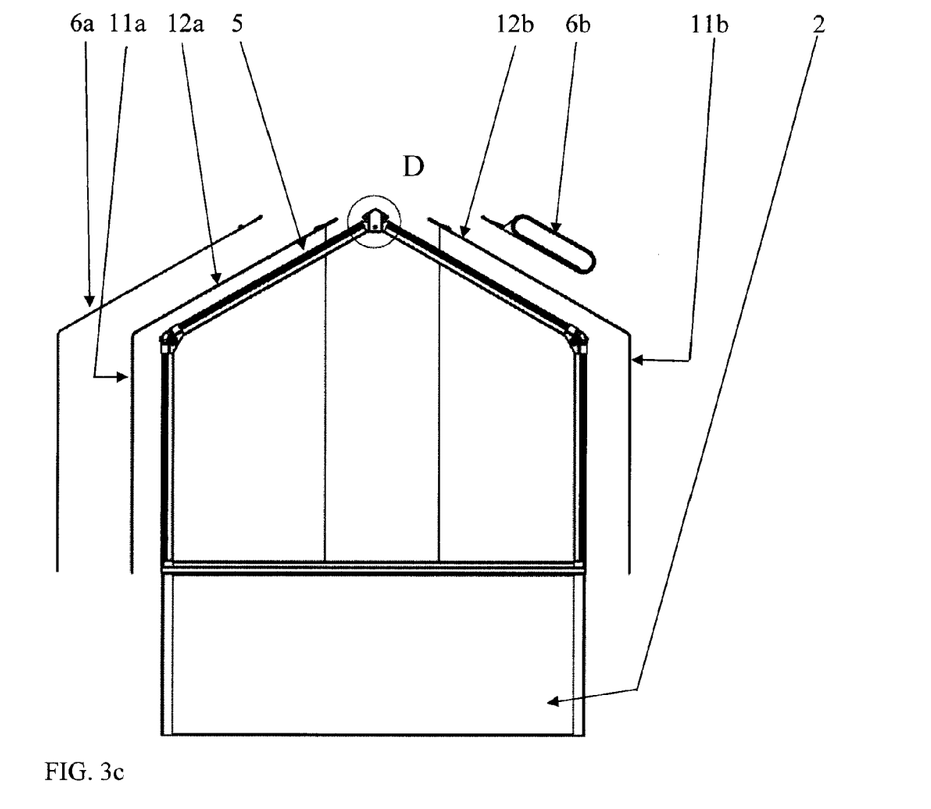

The vertical side members 4, the sloping side members 5 and the horizontal side members 8 are provided with a first part 18*a*, 18*b*, 18 of a Velcro fastening which is illustrated in greater detail on FIG. 3*b*. The flexible cover is divided into sections 6*a*, 6*b* with edge areas 13 following the first part 18*a*, 18, 18*c* of the Velcro fastening and provided with an interacting second part 14 of a Velcro fastening for fastening the edge areas 13 of the section on the side members 4, 5, 8.

Figure 2A:
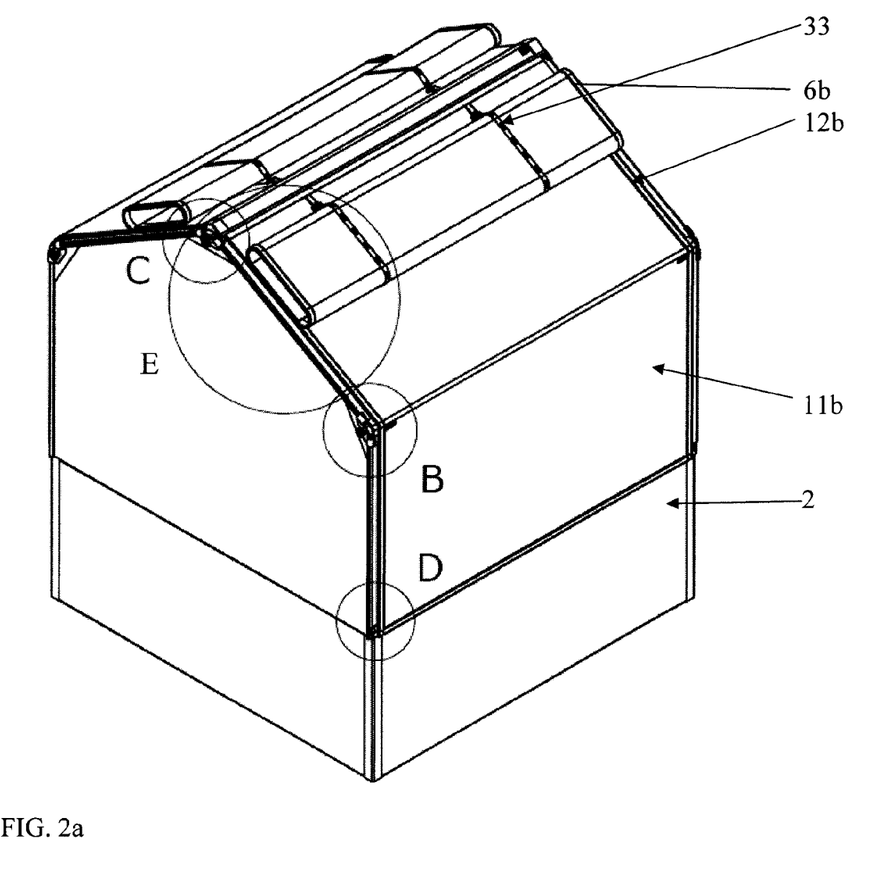
Figure 2B:
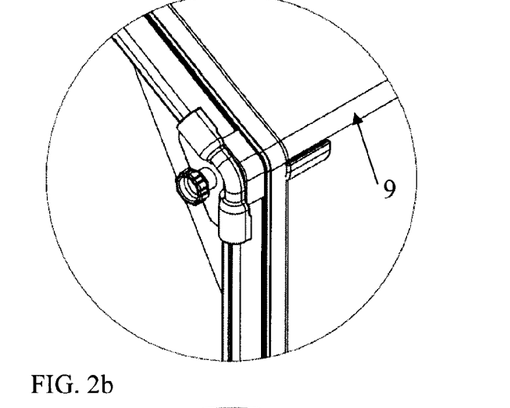
Figure 2C:
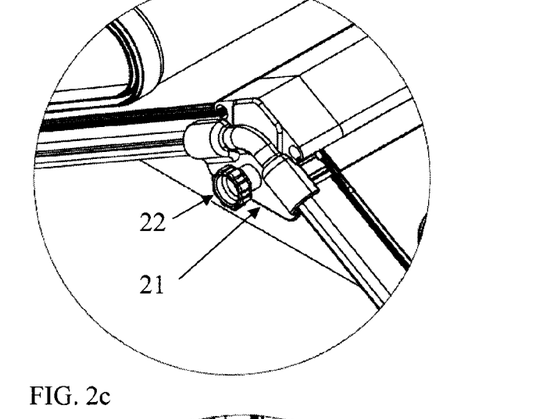
Figure 2D:
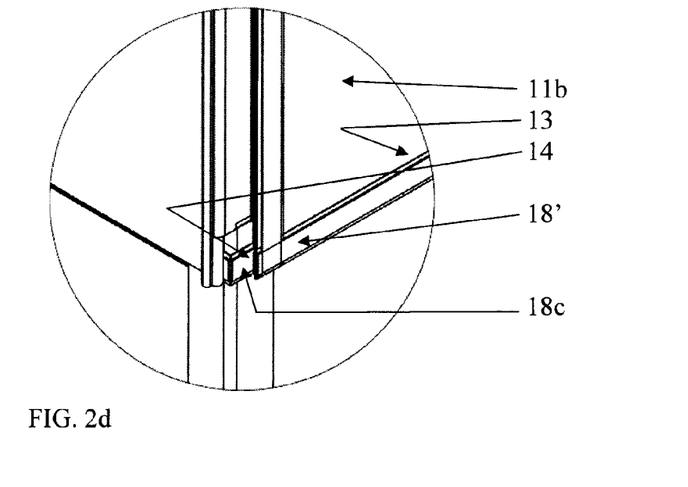

On FIG. 2*a* and particularly shown in detail on FIG. 2*d*, the edge areas 13 of the net sections are provided with the second part 14 of a Velcro fastening at the lowermost side of the edge area 13 for interacting with a first part 18*c* of a Velcro fastening on the side members and with a first part 18' of a Velcro fastening on the top side of the edge area 13. This first part of a Velcro fastening at the top side of the edge area of the net section is used for fastening the outer flexible cover to the net section 11*b*. If a flexible cover is thus built up by an inner flexible cover and an outer flexible cover, the inner flexible cover at the underside of its edge area will have a second part of a Velcro fastening and a first part of a Velcro fastening on the top side of the edge area.

Figure 2E:
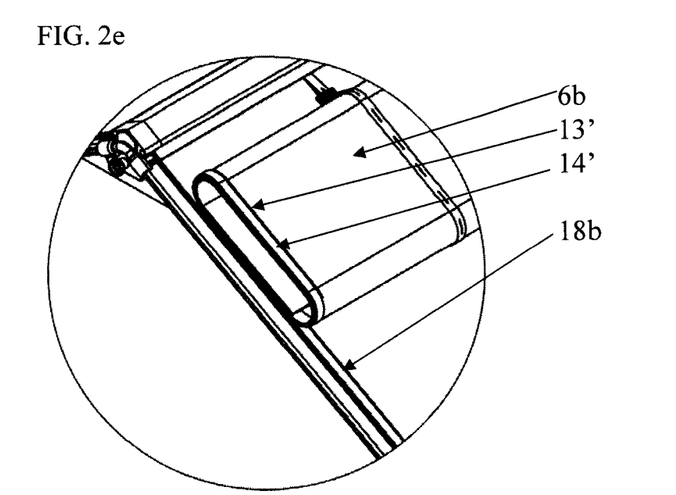

As it appears from FIG. 2*a*, part areas B, C, D and E are enhanced and shown in enlarged version on FIGS. 2*b*, 2*c*, 2*d* and 2*e*, respectively. On FIG. 2*e* is shown a rolled-up outer flexible cover 6*b* having an edge area 13' which at the underside is provided with a Velcro fastening 14' for fastening either directly on a side member 5 or for fastening on the edge area 13 of the lower flexible cover, which is provided at the top side with a corresponding Velcro fastening as well.

Figure 3D:
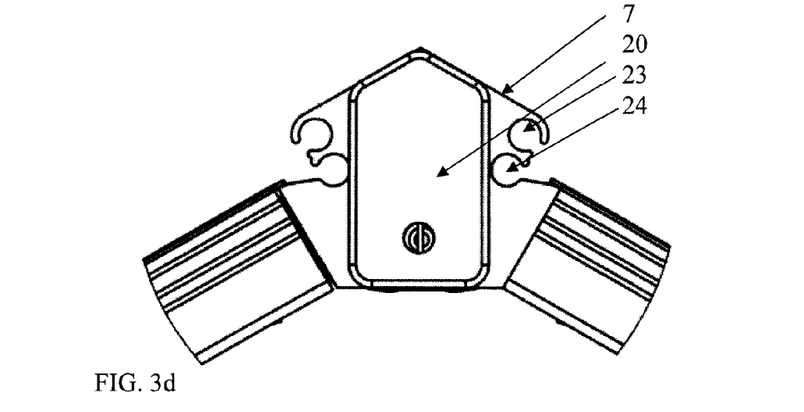
Figure 6:
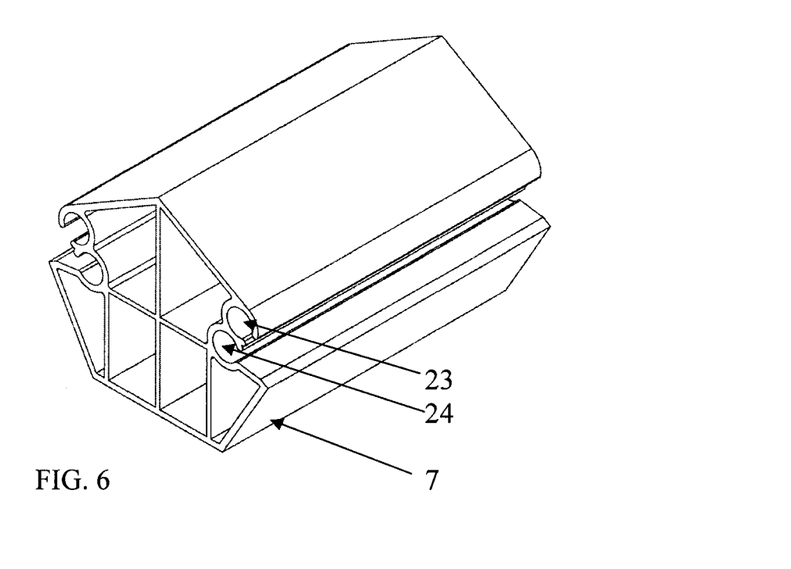
FIG. 6 shows a cross-section of a second central beam with two grooves.

On FIG. 3*b* and in enlarged detail on FIG. 3*d* is shown the end 20 of a central beam 7. This end can be used for fastening end sections of flexible covers, e.g. as illustrated in FIG. 2*c*, where a holder 21 is secured by a screw 22. The same type of holder may also be used at the end of the horizontal rods 9, as shown on FIG. 2*b*. As it appears from the detail view, FIG. 3*d*, the central beam 7 has two grooves 23, 24. This is seen more clearly on FIG. 6, showing a piece of a central beam 7 in perspective view. The upper 23 of these two grooves is used for the outer flexible cover and the lower 24 of the two grooves for the lower flexible cover. Alternatively, one of the two grooves can be used for insulating plates that are inserted with a corresponding edge bead. It is noted that the spacing between the lower grooves 24 is less than the spacing between the two upper grooves 23, the reason being that the flexible covers thereby may have the same length and at the same time have overlapping edge areas 13 at the horizontal side members 8.

The side members can be assembled by snap locks in connecting fittings, as known from tents and awnings for camping caravans.

Figure 5:
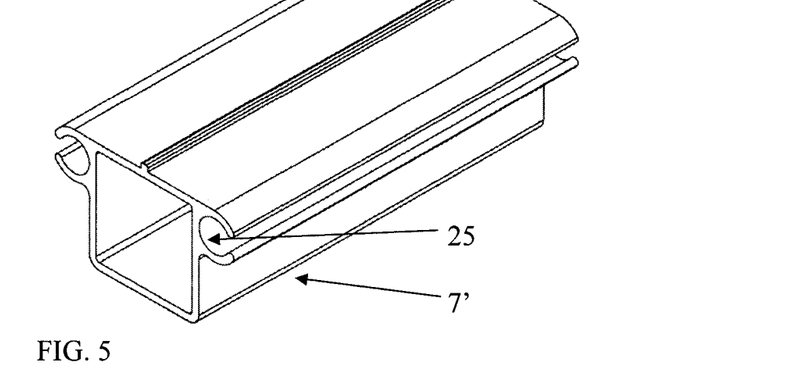
FIG. 5 shows a cross-section of the central beam.

If the cover is not desired with a double flexible cover, the central beam 7' is provided with a single groove 25 as shown on FIG. 5.

If the case is a series of modules in continuation of each other, the ends of this series may be covered by net and/or film/tarpaulin. Such flexible end covers may e.g. be fastened to the side members by means of interaction between the bead of the flexible end cover and a rail with a recess in which the bead is inserted, analogous to the examples in FIGS. 6 and 7.

Figure 7:
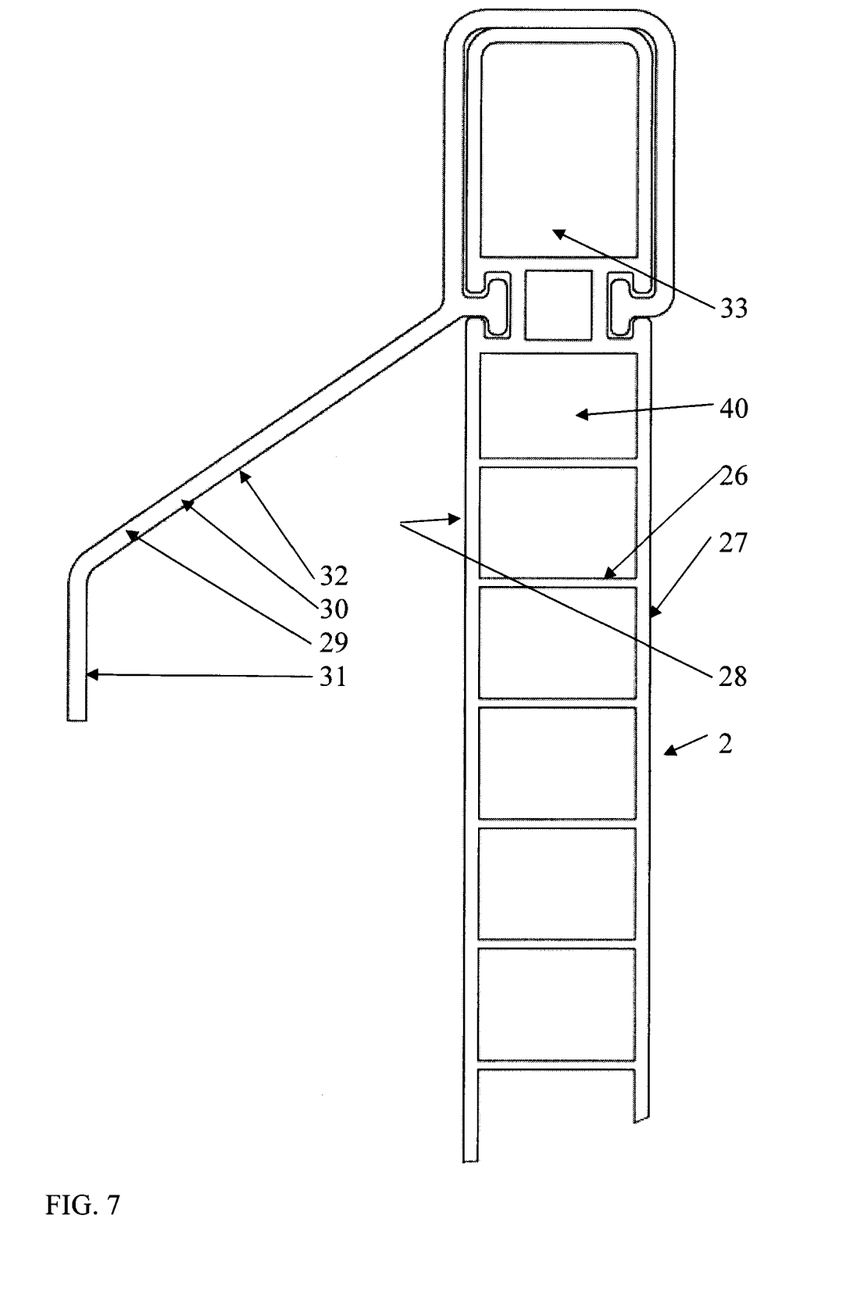
FIG. 7 is a drawing of a slug barrier.

On FIG. 7 is shown a side panel 2 with a channel structure. The individual channels 40 appear at the longitudinal reinforcements 26 between the inner face 27 and outer face 28 of the side panel. The side panels have an upper area 33 on which is fastened a slug barrier 29 having an obliquely downwardly extending plate 30 with a vertically downwardly pointing lower fin 31 which is difficult to overcome for slugs/snails crawling up along the underside 32 of the plate 30.

Side panels as well as central beam and side members are suited for manufacturing by extrusion, preferably extrusion of plastic and/or aluminium.

Figure 4:
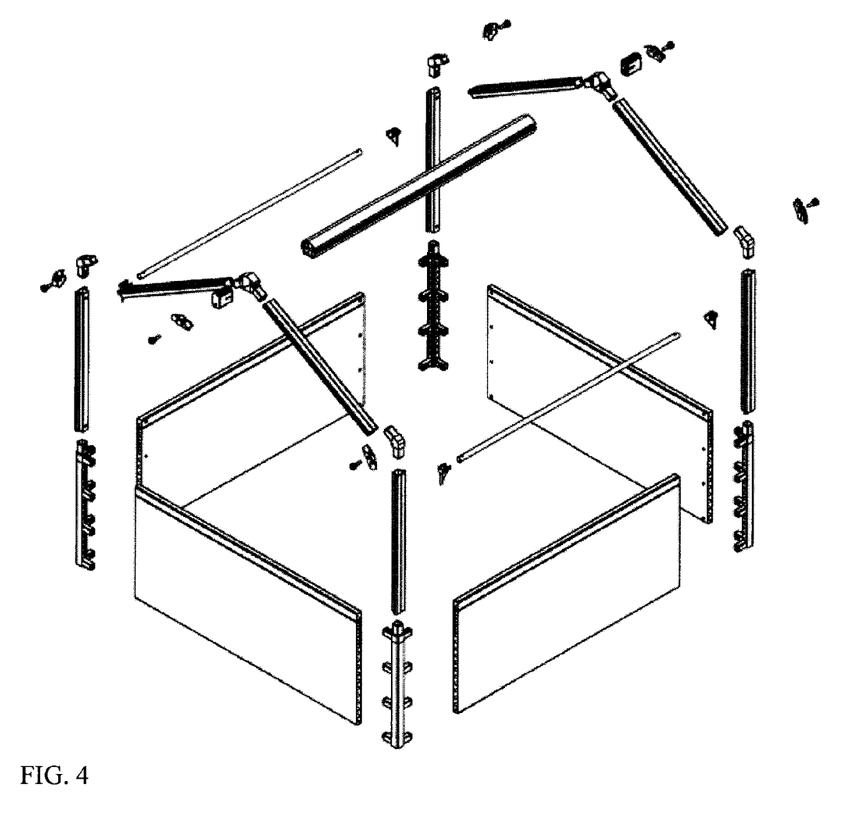
FIG. 4 is an illustration of the elements of the cover.

FIG. 4 shows an exploded view of a cover according to the invention, illustrating the many parts of which such a cover is composed. In spite of the plurality of parts, the cover is easy to produce and assemble, as relatively few components are selected. This means that one component type, e.g. an angle brace, is used at several points in the cover, e.g. as illustrated by the holder 21 as shown on FIGS. 2*b* and 2*c*.

The cover is particularly useful in connection with high beds in gardens. In such cases, the modules typically have a width and a length between 1 and 3 meters. But the modules may be used in connection with larger coverings as well, e.g. for commercially operated greenhouses.

Figure 8A:
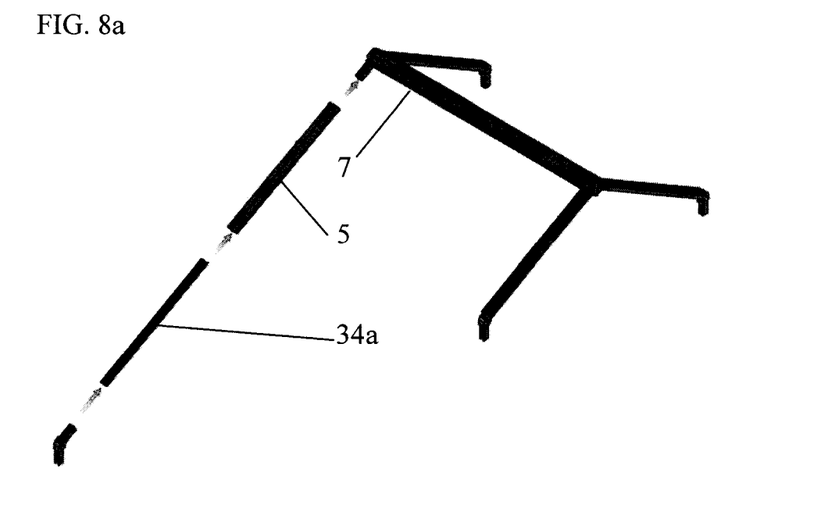
Figure 8B:
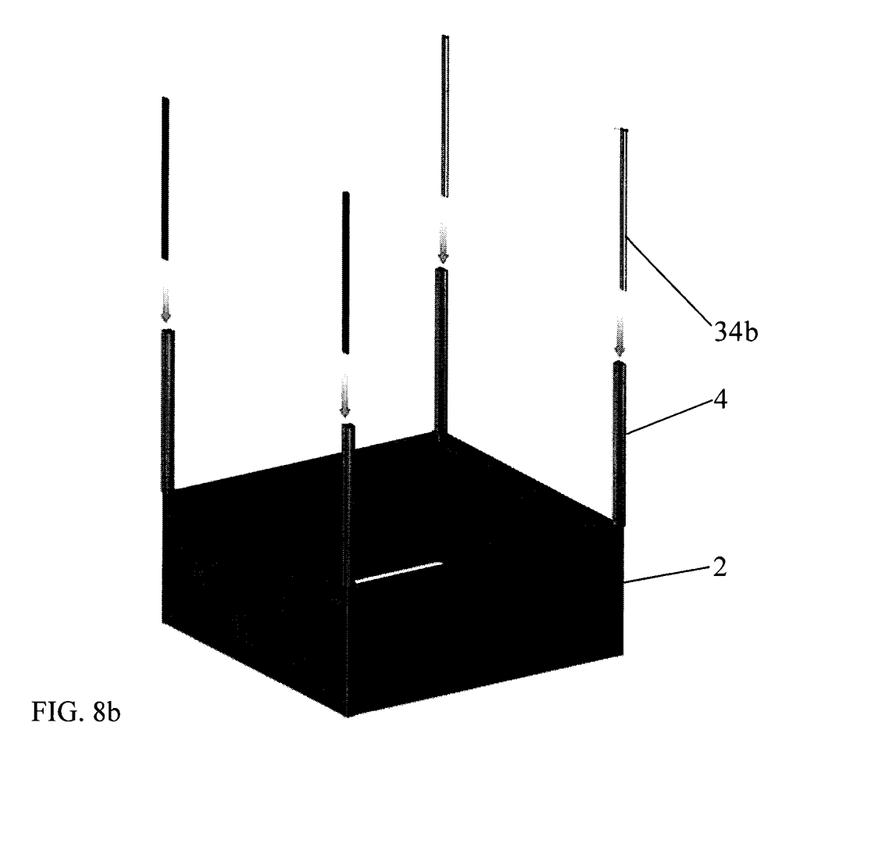
Figure 8C:
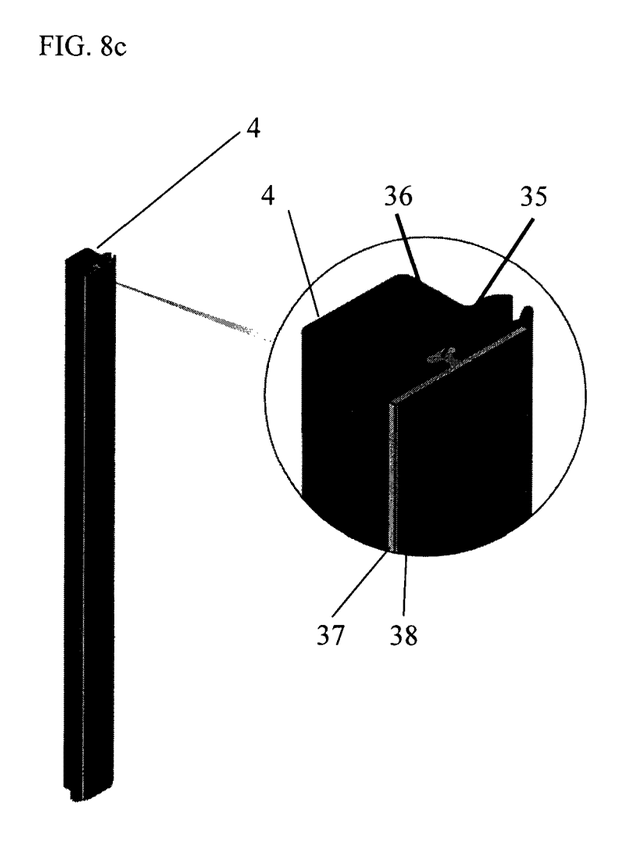

FIG. 8*a* illustrates how a profile 34*a* with Velcro fastening is slid into one of the sloping side members 5. FIG. 8*c* illustrates how a profile 34*b* is slid into the vertical side members 4 in order to form a finished post for mounting the flexible cover. FIG. 8*c* shows an example of an embodiment of such a vertical post in greater detail. The post includes a hole, preferably an extruded side member 4. The side member has a T-shaped groove 36 in which there is inserted a flat profile 37 with a corresponding T-shaped bead 35. At its front side, the flat profile has one part of the Velcro fastening 38 fastened thereon.

Figure 9:
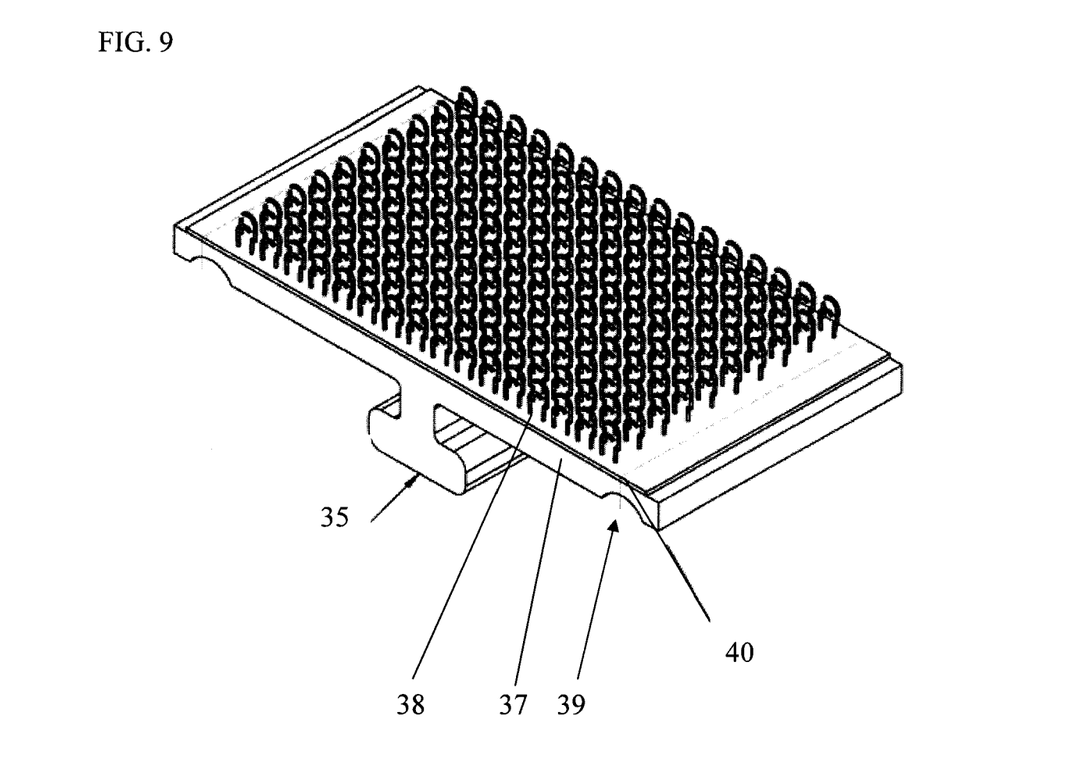
FIG. 9 shows a flat profile with Velcro fastening sewn thereon.

FIG. 9 shows a drawing of a piece of a flat profile 37 with T-shaped bead 35 along the flat profile. The Velcro fastening 38 is fastened to the flat profile 37 by means of seam 40. In order to facilitate the sewing, the flat profile has two webs 39 along the profile where the material along the web 39 is thinner than the rest of the profile 37.

Figure 10A:
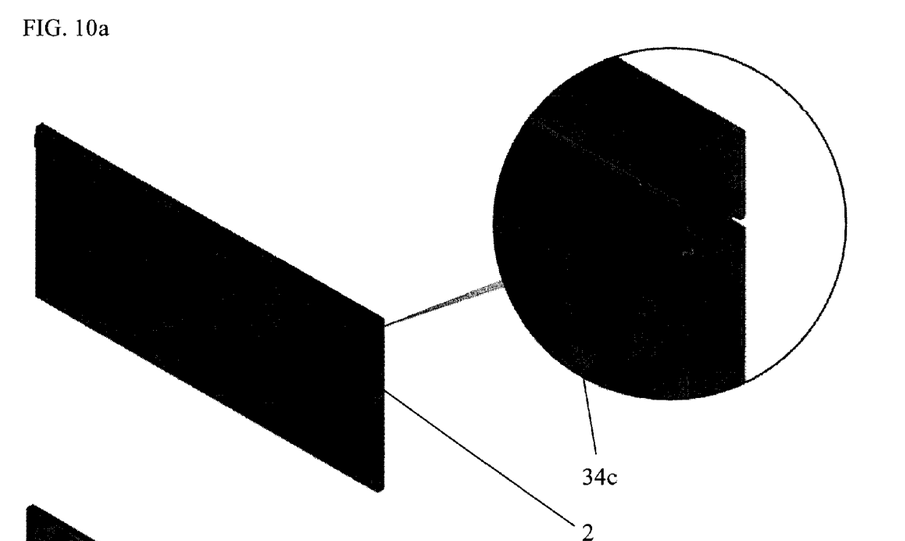
Figure 10B:
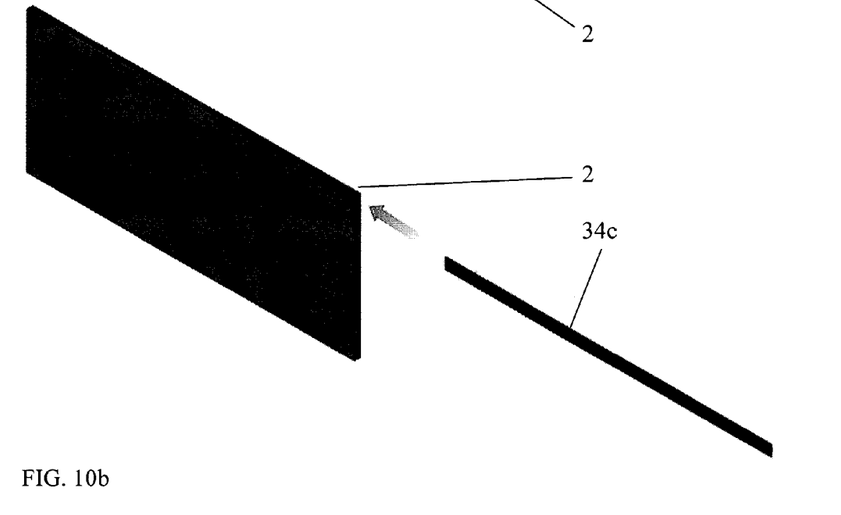

FIG. 10*b* shows a side panel 2 on which a flat profile 34*c* is fastened in a similar way as illustrated in FIG. 8*c* with the T-shaped bead 35 in a T-shaped groove 36. The side panel 2 is of the type illustrated on page 7, however without the fitted slug barrier 32.

Comparison between FIG. 7 and FIG. 10 shows that a side panel with a T-shaped groove or other countersunk groove along the profile is versatile as various accessories can be inserted. For example, there may also be provided a slug barrier, e.g. of the type shown in FIG. 7 which at the same time also includes the Velcro fastening on a rail or flat profile.

The invention claimed is:

1. A cover for a crop, wherein the cover (1) includes a framework (3 4, 5, 7, 8, 9) and flexible cover (6*a*, 6*b*, 6*c*, 10*a*, 10*b*, 11*a*, 11*b*, 12*a*, 12*b*) supported by the framework, characterised in that the flexible cover is divided into sections with edge areas (13) that may be released from the framework independently of each other in order thereby to give access to the crop wherein the flexible cover constitutes an insect barrier between the volume under the framework and the surroundings outside the cover, wherein the framework includes side members (4, 5, 8) provided with a first part (18*a*, 18*b*, 18*c*) of a Velcro fastening, and that the edge areas follow the first part of the Velcro fastening and are provided with an interacting second part (14) of a Velcro fastening for attaching the edge area of the section on the side member, wherein the cover (1) includes a first profile (7) extending across the crops, where the profile has a first concave (23) groove at the side of the profile, and where the flexible cover is provided with a rim bead inserted in the first groove (23) for retaining the flexible cover in the first profile, wherein the first profile has a lower groove (24) and an upper groove (23), being said first groove, at one side of the profile for inserting two rim beads at different levels for two different flexible covers (6*a*, 6*b*, 12*a*, 12*b*), wherein the lower groove (24) of the profile (7) is provided closer to a vertical longitudinal section of the profile than the upper groove (23).

2. Cover according to claim 1, wherein the first profile (7) is provided with grooves along both sides of the first profile, wherein the lower grooves (24) are closer together than the two upper grooves (23).

3. Cover according to claim 1, wherein the side members (4, 5) are joined with the first profile (7).

4. Cover according to claim 1, wherein in one of the two grooves (23, 24) is inserted a rim bead of a net (12*a*, 12*b*) and in the other of the two grooves (23, 24) is inserted a rim bead of a plastic film (6*a*, 6*b*).

5. Cover according to claim 1, wherein the Velcro fastening has a hook part with miniature hooks and a loop part with miniature loops, and where the hook part is provided on the side members (4, 5, 8) and where the loop part is provided on the edge areas (13) of the flexible cover (6*a*, 6*b*, 10*a*, 10*b*, 11*a*, 11*b*, 12*a*, 12*b*).

6. Cover according to claim 1, wherein the side members (4, 5, 8) are provided with longitudinal countersunk grooves, where rails are provided with Velcro fastening attached to these rails, and where the rails are provided with a bead corresponding to the countersunk groove, and where the rails are inserted in these grooves.

7. Cover according to claim 1, wherein the cover (1) includes side panels (2) with a longitudinal countersunk groove, and where rails with attached Velcro fastening are inserted in the groove, and where the rails are provided with a bead corresponding to the countersunk groove.

8. Cover according to claim 6, wherein the rail (35, 37, 38, 39, 40) is a flat profile.

9. Cover according to claim 6, wherein the bead is T-shaped.

10. Cover according to claim 6 provided along a centre line at one side of the rail.

11. Cover according to claim 6, wherein the Velcro material is fastened to the rail by sewing.

12. Cover according to claim 11, wherein the rail is an elongated flat profile which has a number of webs along the flat profile, where the material along these webs is thinner than the rest of the flat profile, where the sewing is performed along these webs in order to facilitate the needle penetrating the material.

13. Cover according to claim 1, wherein the cover (1) includes side panels (2) on which a slug or snail barrier (29) is provided, where the barrier extends downwards at an oblique angle and has at least one fin (31) at the underside of the barrier, where the fin extends downwards at a second angle.

14. Cover according to claim 1, wherein the cover includes side panels (2) on which a snail or slug barrier is provided, where the surface of the barrier is provided with areas with copper.

15. Cover according to claim 1, wherein the flexible cover is double with an outer flexible cover (6*a*, 6*b*) and an inner flexible cover (10*a*, 10*b*, 11*a*, 11*b*, 12*a*, 12*b*), where the inner flexible cover is provided with an edge area (13) which at its underside is provided with one part (14) of a Velcro fastening for attachment on the other part (18*a*, 18*b*, 18*c*) of a Velcro fastening of a side member, and wherein the inner flexible cover furthermore at the top side of the edge area (13) is provided a further part (18') of a Velcro fastening for interacting with a corresponding interacting part (14') of a Velcro fastening on the underside of the edge area (13') of the outer flexible cover.

16. Cover according to any preceding claim 1, wherein the cover is provided as a contiguous series of substantially uniform covering modules.

\* \* \* \* \*